United States Patent [19]

Vinas et al.

[11] Patent Number: 5,503,735
[45] Date of Patent: * Apr. 2, 1996

[54] MEMBRANE FILTRATION SYSTEM WITH CONTROL VALVES FOR OPTIMIZING FLOW RATES

[75] Inventors: Paul F. Vinas, Santa Ana; Dave Spears, Laguna Niguel; Gregg Herzog, Hesperia, all of Calif.; Robert Slovak; Jack Slovak, both of Reno, Nev.

[73] Assignee: Water Factory Systems, Irvine, Calif.

[ * ] Notice: The portion of the term of this patent subsequent to Sep. 2, 2009, has been disclaimed.

[21] Appl. No.: 372,446

[22] Filed: Jun. 26, 1989

[51] Int. Cl.$^6$ .................................................. B01D 61/12
[52] U.S. Cl. ........................... 210/87; 210/90; 210/103; 210/134; 210/136; 210/137; 210/167; 210/194; 210/321.6; 210/416.1; 15/DIG. 2; 134/111
[58] Field of Search ................... 210/90, 96.1, 96.2, 210/137, 140, 143, 195.2, 257.2, 416.3, 900, 254, 258, 259, 295, 136, 196, 87, 103, 134, 194, 321.6, 416.1, 167; 364/500, 502; 134/111; 15/DIG. 7

[56] References Cited

U.S. PATENT DOCUMENTS

| 3,774,763 | 11/1973 | Yall et al. | 210/259 |
|---|---|---|---|
| 3,856,676 | 12/1974 | Grimme et al. | 210/96.2 |
| 3,992,301 | 11/1976 | Shippey et al. | 210/96.2 |
| 4,482,456 | 11/1984 | Grayson | 210/257.2 |
| 4,610,790 | 9/1986 | Reti et al. | 210/295 |
| 4,652,368 | 3/1987 | Ennis et al. | 134/111 |
| 4,741,823 | 5/1988 | Olsen et al. | 210/96.2 |
| 4,784,763 | 11/1988 | Hambleton et al. | 210/900 |

FOREIGN PATENT DOCUMENTS

| 59-49888 | 3/1984 | Japan | 210/143 |
|---|---|---|---|
| 0129103 | 7/1985 | Japan | 210/900 |
| 2250988 | 10/1987 | Japan | 210/137 |
| 3116706 | 5/1988 | Japan | 210/96.1 |
| 3194709 | 8/1988 | Japan | 210/90 |

OTHER PUBLICATIONS

PRO Spot Free Rinse Systems brochure entitled "Application" (1988).
Water Factory Systems brochure entitled "Acro Advanced Computerized Reverse Osmosis System" (1989).
PRO Spot Free Rinse Systems publication entitled "Syncro Microprocessor Controlled Reverse Osmosis System" (Date of Publication Unknown).

*Primary Examiner*—Robert A. Dawson
*Assistant Examiner*—Joseph Drodge
*Attorney, Agent, or Firm*—Willian Brinks Olds Hofer Gilson & Lione

[57] ABSTRACT

A liquid purification system is disclosed. In this system water is pumped into a filter cartridge. A reverse osmosis filter membrane in the filter cartridge removes impurities from the water, but not all of the water passes through the membrane. Water passing through the membrane exits the filter cartridge through a first outlet port, and is sent to a storage tank. Water not passing through the filter membrane exits the filter cartridge through a second outlet port. This water then passes through a pressure relief valve. The pressure relief valve can be adjusted to vary the water pressure and flow rates in the system. Some of the water exiting the pressure relief valve passes through a flow restrictor valve and then to drain. The flow restrictor maintains a constant flow rate at variable pressures. In this system, the flow restrictor is operable to maintain the same flow rate through it to drain and through the first filter outlet port. The match of these two flow rates results in a preferred 50% recovery rate of filtered water. Water that does not pass through the flow control restrictor is returned to the pump inlet for recycling through the system. An automatic flush system and various control functions for operation of the system are also disclosed.

15 Claims, 7 Drawing Sheets

ARRANGEMENT OF SHEETS

| 1A | 1B | 1C |
|----|----|----|
| 1D |    | 1E |

MEMBRANE FILTRATION SYSTEM WITH CONTROL VALVES FOR OPTIMIZING FLOW RATES

BACKGROUND OF THE INVENTION

The present invention relates generally to a system for purifying a liquid. In a preferred embodiment the invention specifically relates to an improved pressure and flow control system in a water purification system that uses reverse osmosis filtration.

Reverse osmosis (R.O.) filtration systems have been used to remove impurities from water. One end use for water purified in this manner has been rinse water in car washes. Removing impurities from the rinse water reduces spotting when the water dries, which is commonly referred to as a "spot free rinse (SFR)."

FIG. 1 shows the pertinent elements of a conventional SFR water purification system that is intended for applications requiring at least 500 gallons of filtered water per day. In this system feed water first passes through a prefilter 2. A valve 4 is provided to obtain samples of the feed water for evaluation. A solenoid valve 6 provides on/off control of the flow of feed water. A pump 8 circulates the water through the system. A switch 10 is provided to deactivate the pump if the pump inlet pressure is too low. The switch 10 also activates the pump, after a time delay, if the pump inlet pressure is high enough.

The pumped water is fed to a reverse osmosis filter cartridge 12. This filter removes impurities from the water with a reverse osmosis filter membrane (not shown). The water that passes through the membrane (i.e., the water from which impurities have been removed) flows out of a first outlet port 14 to a product water storage tank 16. Along the way, the product water passes a probe 18, a product water flow meter 20, and a spring loaded check valve 22. The product water probe 18 is available to evaluate characteristics of the product water. The product water in the storage tank 16 is available for its intended end use, which in this system is a spot free rinse application.

The pumped water that does not pass through the R.O. filter membrane exits the filter cartridge 12 through a second outlet port 24. This water passes by a pressure gauge 26, and then splits between two channels. Some of the water passes through a Paraplate backflow regulator valve 28 and returns directly to the pump 8. This water is recycled through the R.O. filter 12. The backflow regulator valve is an expensive component, and controls the water pressure in the system.

The remaining water exiting the second outlet port 24 passes through a WHITEY regulating brine valve 30, a drain water flow meter 31, and then to drain 32. This water then leaves the filtration system, and thus is referred to as "waste" water. The brine valve 30 controls the flow of water to the drain 32, and thereby contributes to the control of the velocity of water across the R.O. membrane.

A solenoid valve 34 is provided for flushing the R.O. filter membrane. This flush valve is closed during the previously described filtration operation. When it is open, however, most of the feed water passes through the second outlet port 24 and the flush valve 34, so that a higher, more turbulent flow is created along the R.O. membrane, thereby acting to cleanse the membrane.

Efficient filtration is achieved when the flow rates indicated by the product water flow meter 20 and the drain water flow meter 31 are the same. With these equal flow rates, the water recovery rate (i.e., amount of feed water that is purified to product water) is 50%. If recovery rate is too high, as indicated by a high product water flow rate, the R.O. membrane may foul quickly. This can happen if the brine valve 30 is accidentally closed. If the water recovery is too low, as indicated by a high drain water flow rate, the system is not operating efficiently and may not produce the desired gallons per day.

In order to obtain efficient filtration with the system shown in FIG. 1, the backflow regulator valve 28 and the brine valve 30 are adjusted until the flow rate in both the product water flow meter 20 and the drain water flow meter 31 are in the same range. At the same time, however, the water pressure indicated by the pressure gauge 26 should not exceed the maximum pressure recommended for the pump 8 (e.g., 200 psi). If the water pressure is too high, the pump will wear out quickly.

While the foregoing adjustments may appear to be simple, the proper adjustment can be very elusive because there is not a linear relationship between the two control valves 28 and 30 and the three key variables they affect (i.e., product water flow rate, drain water flow rate, and pressure). For example, the two flow rates could be drawing closer to each other and a slight turn of one valve sends the system pressure up to 250 psi. Turning the other valve may start widening the gap between the two flow rates. Obtaining the proper adjustment is more of an art than a science, and at times can be a tedious, time-consuming, frustrating effort. This is not a user friendly system. The problem is compounded by changes in the feed water (i.e., water temperature, TDS, etc.) which may require new adjustment to the two valves.

SUMMARY OF THE INVENTION

The present invention is directed to a liquid purification system having an improved flow rate and pressure control system. According to the invention the liquid purification system includes a pump that will circulate liquid through the system. The pumped liquid will pass through a filter that has a filter membrane, a first outlet and a second outlet. The first outlet transports liquid that passes through the filter membrane. The second outlet transports liquid that passes through the filter element, but not through the filter membrane. A first valve is connected to the second outlet and is operable to control pressure and flow rate of liquid through the system. A flow control element is connected in series between the first valve and drain. The flow control element is operable to maintain a substantially constant flow rate at variable pressures.

In its preferred mode of operation, the maximum flow rate and pressure of the system is predetermined and indicated on a flow meter and pressure gauge, respectively. As the first valve is closed, the system pressure and product flow rate increases. When either the specified maximum flow rate or specified maximum pressure is reached, no further adjustment is necessary. The flow control element provides equal product water and drain water flow rates, and hence the preferred 50% recovery rate for the given feed water at the specified maximum flow rate or specified pressure for the system. Thus, the present invention requires the simple adjustment of a single valve to achieve the proper filtration efficiency of the system, as opposed to the non-linear two valve adjustment of the system in FIG. 1. The present invention can also be built with fewer and less expensive components for controlling filtration efficiency.

In a preferred embodiment, the present invention incorporates a reverse osmosis filter membrane, and only requires one flow meter at the first filter outlet. The first valve is a pressure relief valve that is operable to permit some liquid to flow through it even when the valve is closed. This valve in combination with the flow control element always allows some flow to drain, and thus reduces the opportunity for overheating the water that is recycled through the filter. A check valve can be provided to prevent fluid flow from the inlet side of the pump to inlet side of the flow control element. This prevents the flow control element from drawing fluid from the pump inlet during a flush cycle.

The present invention also can be provided with an automatic flush system. The flush system includes a second valve that is connected to the second filter outlet. This valve is opened and closed automatically at predetermined intervals. When the second valve is open, most of the liquid in the system will be pumped through the second filter outlet. This results in increased flow across the surface of the filter membrane, which cleanses the membrane.

The present invention can be equipped with a control system that automatically controls several functions of the liquid purification system. The following functions can be automatically controlled: selection of a range of impurities to be removed from the liquid; periodic checks on the range of impurities removed from the liquid; deactivation of the pump if the filter does not remove a predetermined range of impurities from the liquid; deactivation of the pump for an indefinite amount of time if the pump is cycled on and off too frequently; control of the automatic flush system; and checking the integrity of the control system itself.

The invention itself, together with further objects and attendant advantages, will best be understood by reference to the following detailed description taken in conjunction with the drawings.

Figure FIG. 3 A-E (hereinafter referred to as "FIG. 3") is a schematic diagram of the microprocessor system controller of the preferred embodiment of the present invention.

DETAILED DESCRIPTION OF A PREFERRED EMBODIMENT

Figure 1:
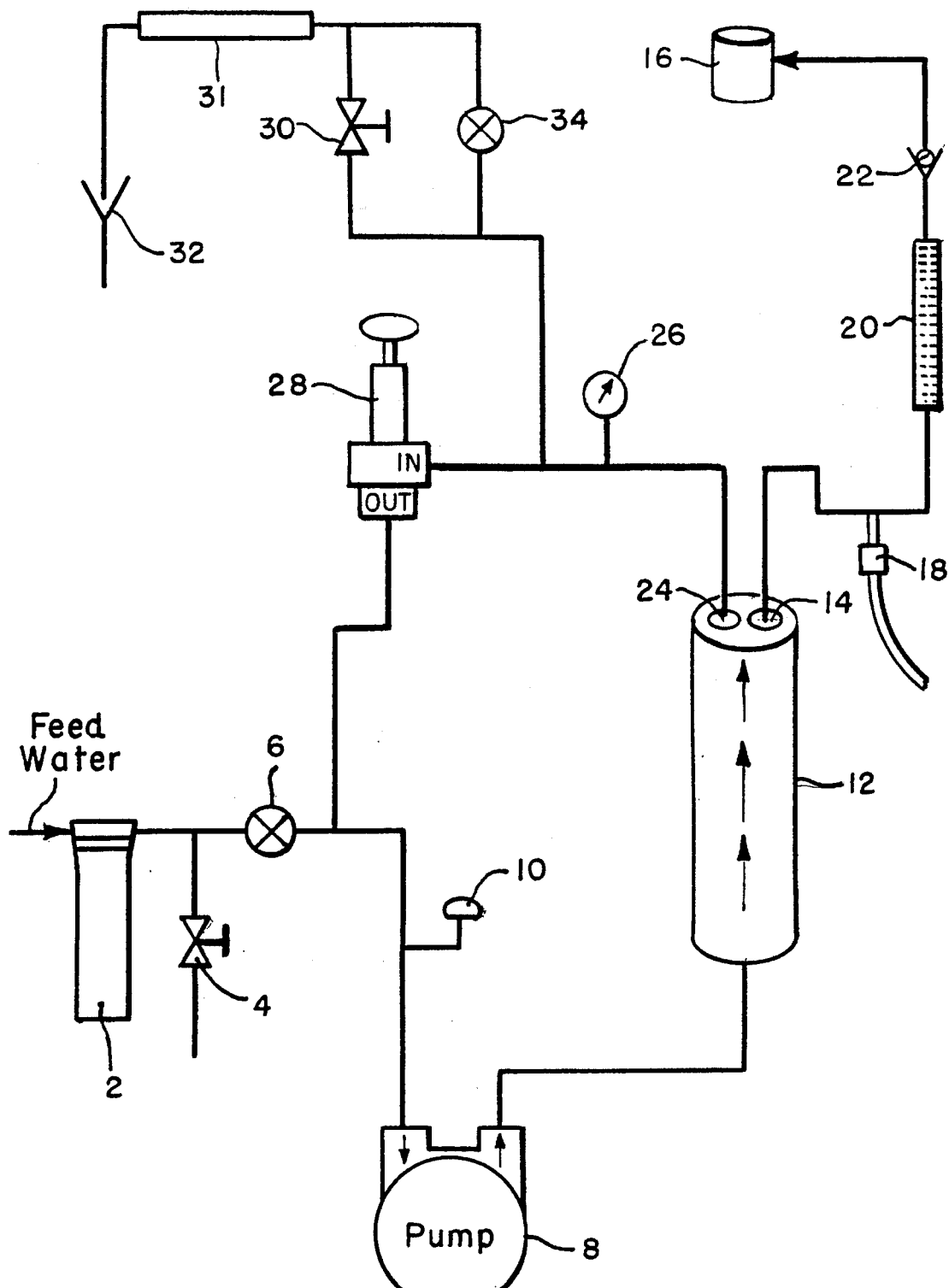
FIG. 1 is a schematic diagram of a conventional water purification system for a spot free rinse application.
Figure 2:
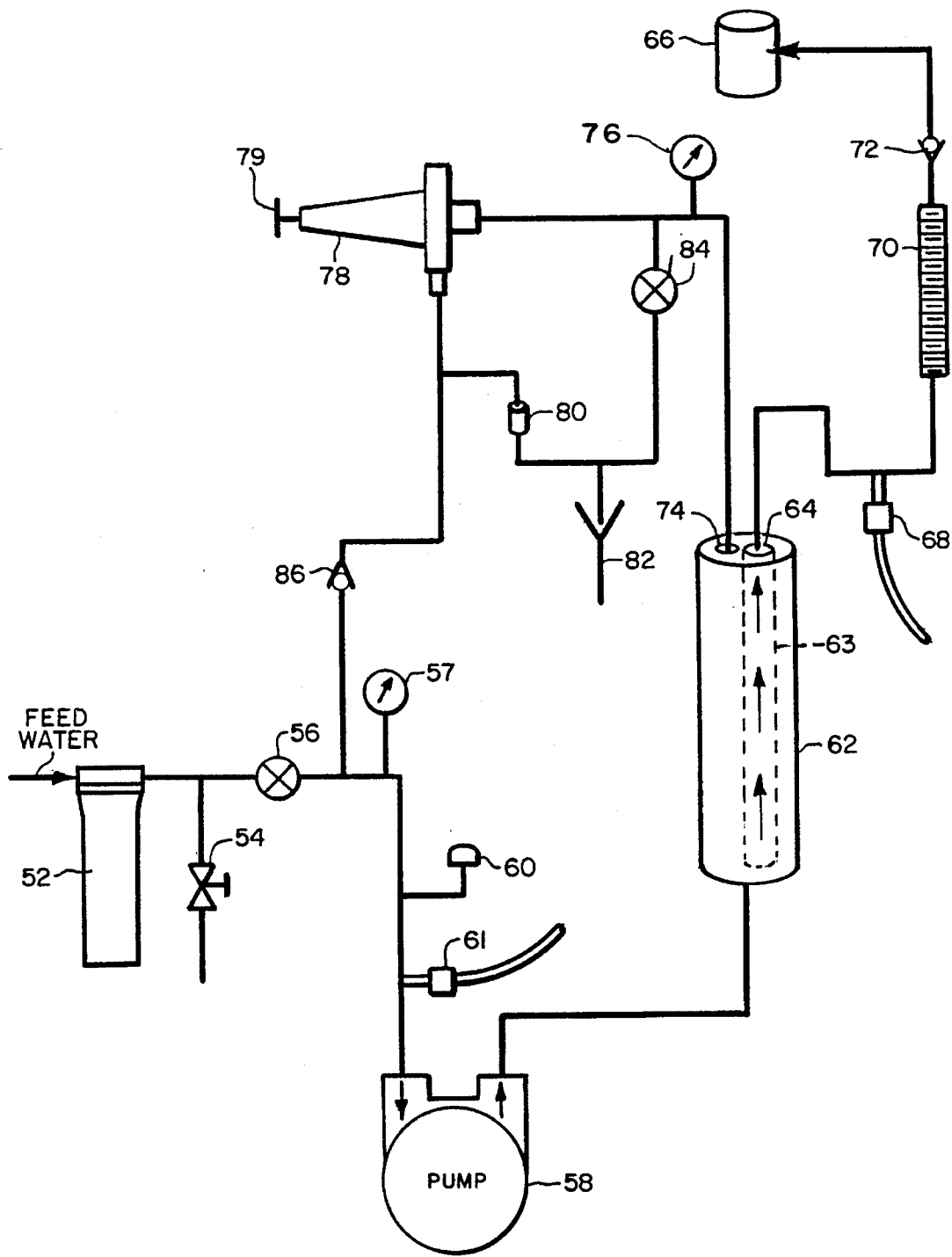
FIG. 2 is a schematic diagram of the preferred embodiment of the present invention.
Figure 3A:
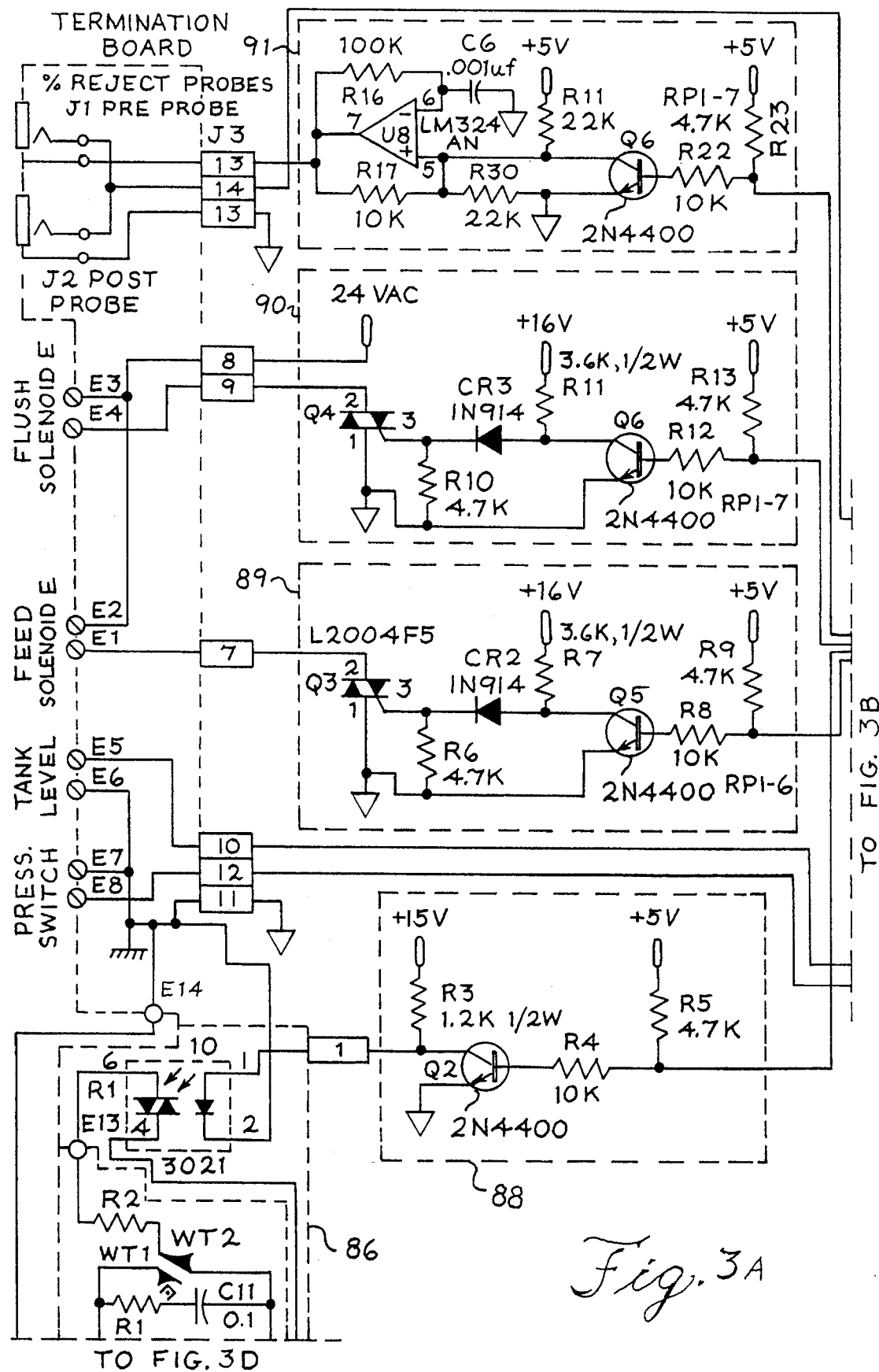
Figure 3B:
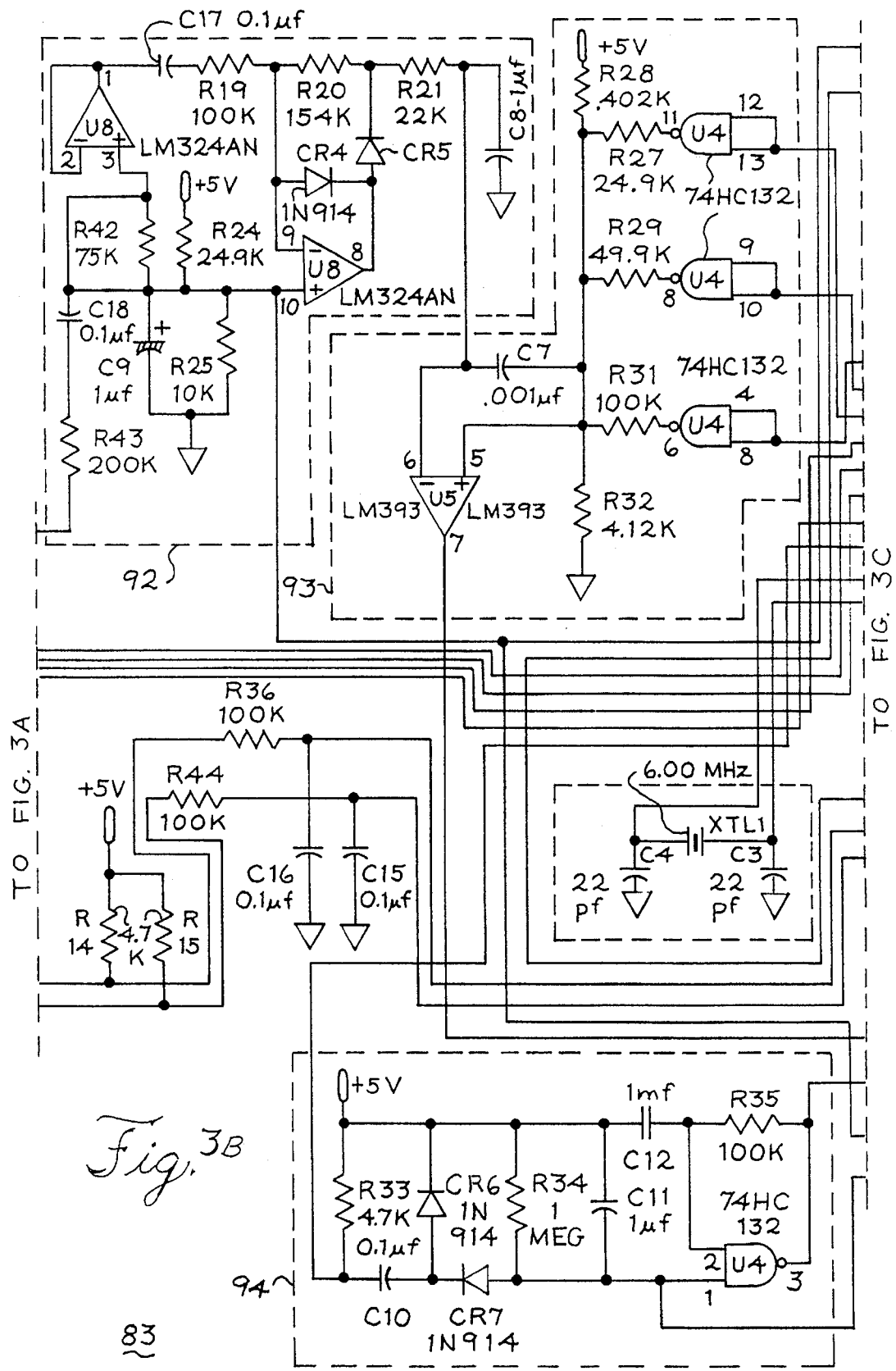
Figure 3C:
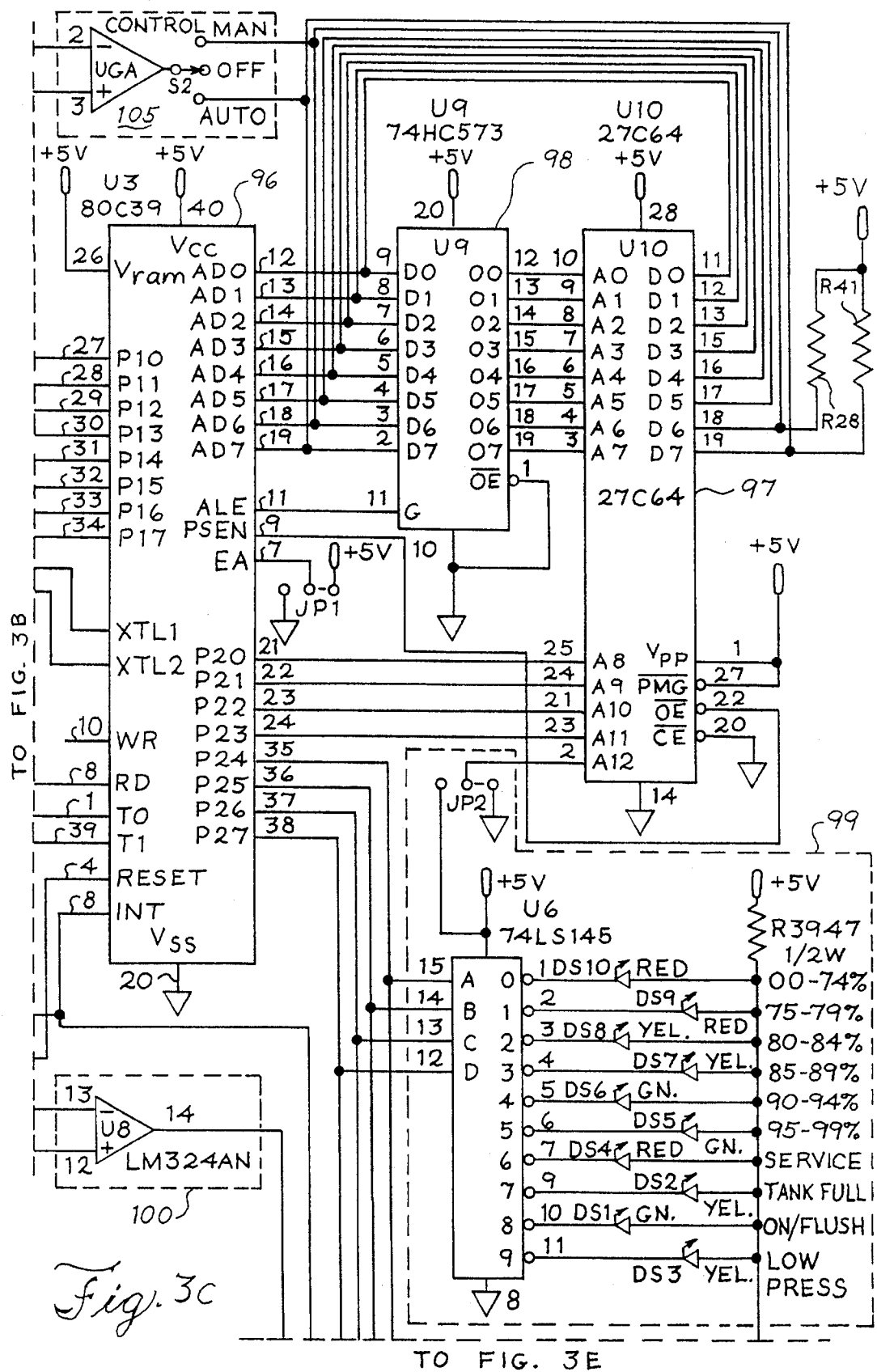
Figure 3D:
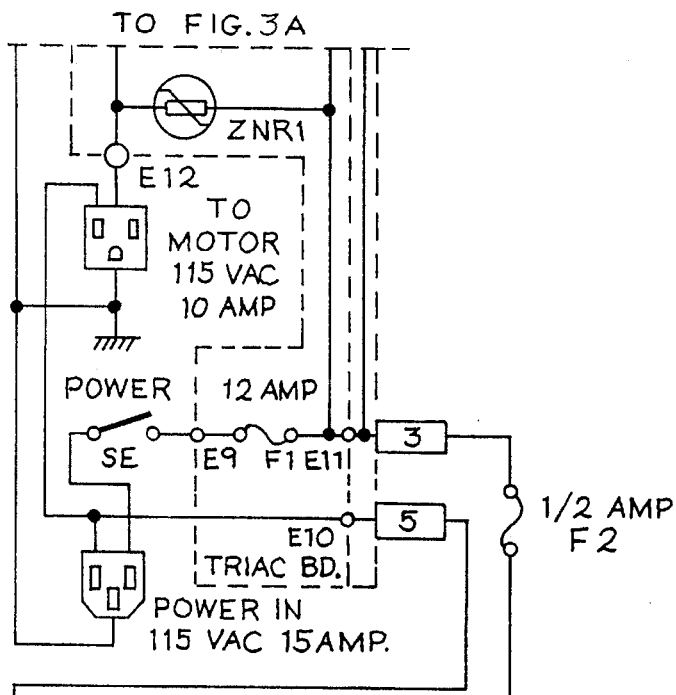
Figure 3D:
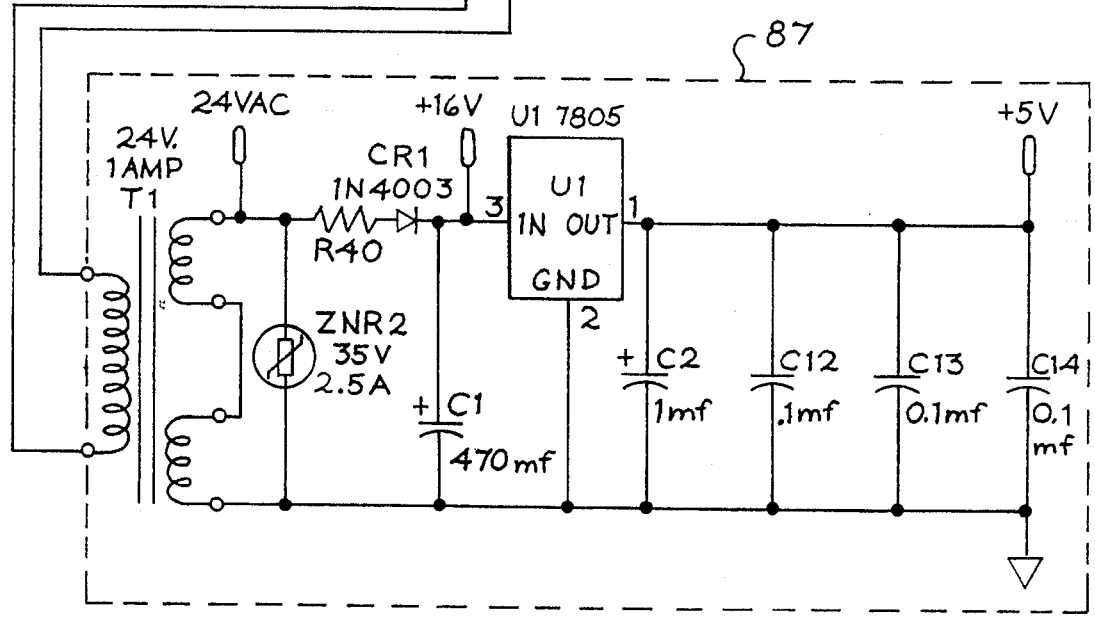
Figure 3E:
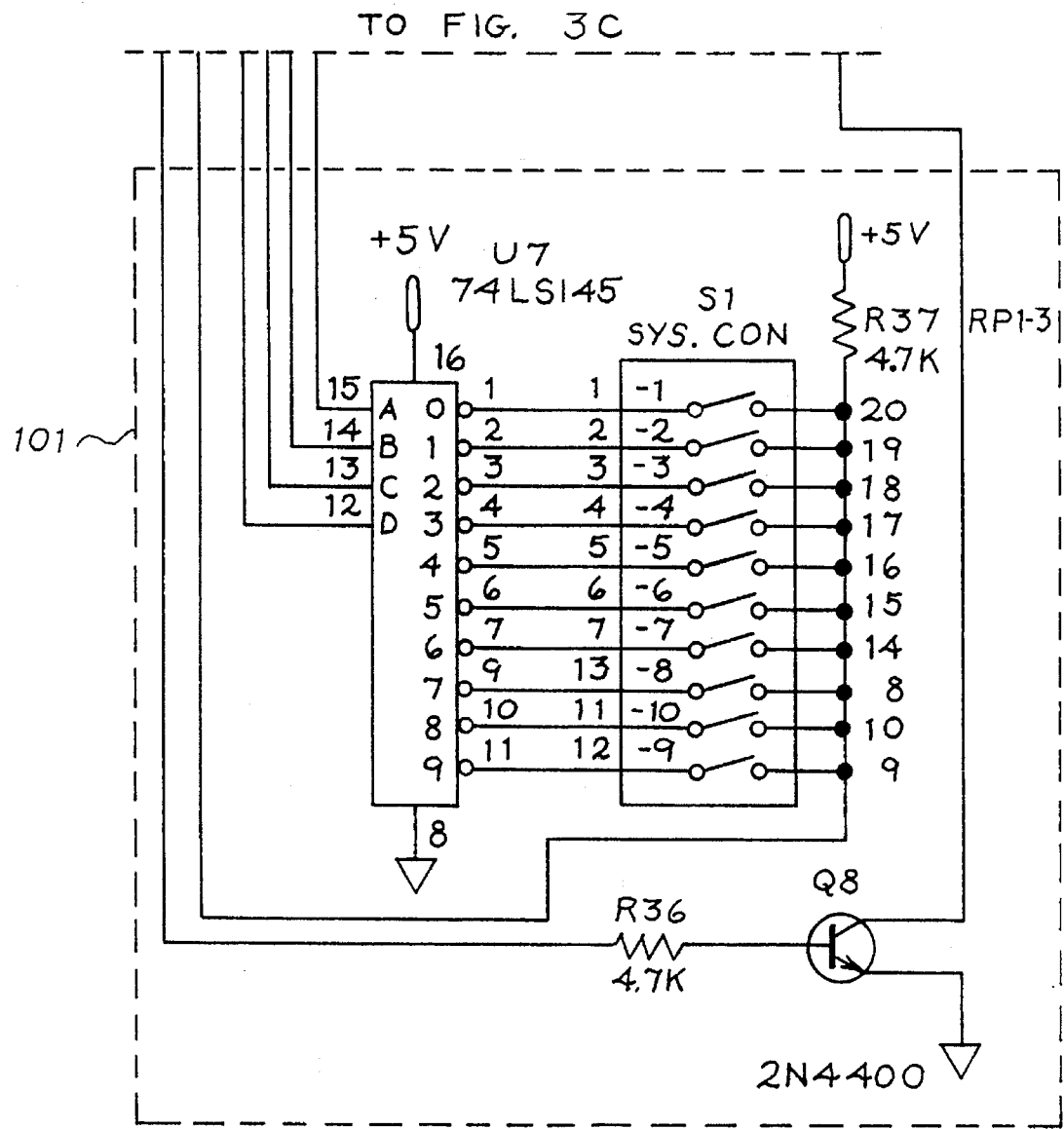

Referring now to FIG. 2, the water purification system of the preferred embodiment of the present invention begins with feed water that may come from any source, such as a municipal water supply. In this embodiment the feed water first passes through a conventional prefilter 52. A preferred prefilter 52 is a ten inch, ¾ port filter in an AMETEC housing. Generally, at least one prefilter 52 is required. An additional carbon prefilter may be required to remove chlorine from the feed water. In another embodiment the feed water may pass through a water softener before it passes through the prefilter 52. The water softener may remove calcium and magnesium ions.

A feed water sample valve 54 is provided to obtain samples of the feed water. The water may be evaluated for hardness and chlorine. A solenoid valve 56 provides on/off control of feed water to the R.O. filtration system. A pressure gauge 57 is provided to monitor the pressure of the feed water. A pump 58 circulates water through the R.O. filtration system. The preferred type of pump 58 is a PROCON 2607A booster pump. The pump should be large enough to circulate the water at a rate that generates turbulence across the filter membrane. This turbulence tends to make the filter system "self-cleansing."

A low pressure switch 60 (e.g., Texas Instruments, LP 10-25) is provided to measure the pump 58 inlet pressure. A feed water probe 61 monitors the feed water for its total dissolved solids (TDS) content.

The feed water is pumped to a filter cartridge 62 that utilizes a reverse osmosis filter membrane 63. A preferred R.O. filter is the FILMTECH TW 30-4040 TFC (4" diameter by 40" long). In larger systems, a second R.O. filter cartridge may be placed in series with the filter cartridge 62. R.O. filter membranes are well known in the art for the manner and extent to which they remove contaminants or impurities from water and other liquids. The filter cartridge 62 may be a disposable pressure vessel. The water that passes through the membrane 63 (i.e., the water from which impurities are removed) flows out of a first outlet port 64. This water is referred to as the product water or recovered water. A typical R.O. membrane has a rated output of 1800 gallons per day, which equates to a 1.25 GPM flow rate.

The product water may be stored in a vessel 66 until it is needed in a spot free rinse application. The storage vessel 66 can be equipped with a water level sensor 67. A product water probe 68 is provided to measure the TDS of the product water. A flow meter 70 is provided to measure the flow rate of the recovered water. This is the only flow meter that is needed in this system for indicating water flow for maximum filtration efficiency. Of course, additional flow meters can be added at other points in the system for informational purposes. A check valve 72 is provided to prevent flow of product water back into the filter cartridge 62.

The water that is pumped into the filter cartridge 62 but does not pass through the filter membrane 63 exits the filter cartridge 62 at a second outlet port 74. A pressure gauge 76 monitors the pressure of this water, which reflects system pressure and the pressure on the filter membrane 63. During the filtration process the flush solenoid valve 84 is closed and all the water passing through the second outlet port 74 flows through a pressure relief valve 78. The control knob 79 is provided to adjust the flow of water through the pressure relief valve, and thereby adjust the flow rates and water pressure in the R.O. filtration system. A preferred pressure relief valve 78 (Type 8460 Spraying Systems) is utilized in a manner that permits some liquid to pass through it, even when its control knob is turned to its closed position. This seepage prevents the liquid flow to drain from completely stopping if the pressure relief valve is inadvertently closed.

A flow control element (restrictor) 80 is connected in series between the low pressure side or outlet side of the pressure relief valve 78 and the system drain 82. The flow control restrictor maintains a constant flow rate through it at different pressures. The constant flow rate in the flow control restrictor 80 is achieved by a variable area orifice that is dependent on the liquid pressure. The flow control restrictor 80 can be selected for whatever recovery rate is desired. For example, if a 50% recovery rate is preferred and the R.O. membrane rated output is equivalant to 1 GPM, then a 1 GPM flow control restrictor 80 should be used. A preferred flow control restrictor 80 is a DOLE 1 gal. Flow Control ⅜". The flow control element 80 will then maintain the desired 50% recovery rate, allowing for some variations due to slight changes in operating conditions and the flow rates of the R.O. membrane and flow control element not having an exact match. The flow control element 80 could also be selected to have a lower flow rate than the R.O. membrane that provides a 75% recovery ratio.

Some water flowing through the pressure relief valve 78 does not pass through the flow control restrictor 80. This water passes through a check valve 86 and is fed back to the inlet side of the pump 58. The pump then recycles this liquid back through the R.O. filter 62 and the rest of the filtration system.

As previously mentioned, the flush solenoid valve 84 is closed during the filtration process. It is periodically opened, however, to flush the R.O. membrane 63. When the flush solenoid 84 is open, recovery of water through the filter membrane 63 is negligible. Most of the water in the system flows across the membrane, out of the second outlet 74, past the flush solenoid 84, and directly to drain 82. The increased liquid flow across the membrane 63 creates turbulent conditions which dislodge impurities from the filter membrane. The life of the filter membrane is thereby extended. During the flush cycle, the check valve 86 prevents back flow from the pump inlet through the flow control restrictor 80.

The preferred embodiment of the present invention is also provided with a microprocessor-based automatic control system. The hardware for this microprocessor controller 83 is shown in FIG. 3. The microprocessor controller 83 is on a printed circuit board that interfaces with a terminal board 85 and a triac board 86. All three of these printed circuit boards are mounted in a waterproof, rustproof housing. The terminal board 85 provides connections for the feed water probe J1 and for the product water probe J2. Terminals E3 and E4 are for the flush solenoid valve 84. Terminals E2 and E1 are for the feed water solenoid valve 56. Terminals E5 and E6 are for the storage tank level sensor 67. Terminals E7 and E8 are for the pump inlet pressure switch 60. The triac board 86 contains an optical coupler and other circuitry for switching the motor for pump 58 off and on.

The microprocessor controller board 83 contains circuitry for a power supply which is indicated generally by box 87. Circuitry for controlling the optical coupler on the triac board 86 for the pump motor is generally indicated by box 88. Circuitry for controlling the feed water solenoid 56 and the flush solenoid 84 is shown generally by boxes 89 and 90 respectively. Box 91 generally indicates the circuitry that is used for energizing the feed water probe 61 and the product water probe 68. Box 92 generally shows the circuitry provided for demodulating signals received from the feed water probe 61 and the product water probe 68. Box 93 includes an analog to digital converter for data received from the demodulator circuitry in box 92. Box 94 generally indicates a watchdog circuit that is controlled by software to detect software failures, and to reset the microprocessor when software failures occur. Box 95 includes circuitry for an oscillator clock that drives the microprocessor chip 96.

The microprocessor 96 is connected to an EPROM 97 through a latch 98. The microprocessor also interfaces with a bank of LEDs that are shown in box 99. The top six LEDs are used to indicate the percentage of impurities in the feed water that are absent in the product water. This is sometimes referred to as the "% reject ratio." The other LEDs respectively indicate if the unit requires service, if the storage tank 77 is full, if the unit is in flush mode, and if the pump 58 inlet pressure is below its threshold level. Box 100 generally indicates circuitry that is provided to shut down the LED display 99 if the system software fails.

Box 101 contains 10 DIP switches and their associated circuitry. These DIP switches select various control functions. These various control functions and their respective switch settings are listed in Table 1 below. An asterisk appears next to the preferred switch setting. Each function is described further below.

TABLE 1

| SWITCH | | FUNCTION 1 | FUNCTION 2 |
|---|---|---|---|
| #1 | #2 | RUN TIME | FLUSH TIME |
| ON | ON | DISABLE | DISABLE |
| OFF | ON | 30 MINUTES | 60 SECONDS |
| ON | OFF | 60 MINUTES | 60 SECONDS |
| OFF | OFF* | 120 MINUTES | 120 SECONDS |
| #3 | #4 | % REJECT SETPOINT | |
| ON | ON | <50% | |
| OFF | ON | <80% | |
| ON | OFF | <90% | |
| OFF | OFF* | <95% | |
| #5 | | % REJECT READ CYCLE | |
| ON | | 255 SECONDS | |
| OFF* | | 60 SECONDS | |
| #6 | | MOTOR ON DELAY | MOTOR OFF DELAY |
| ON* | | 30 SECONDS | 3 SECONDS |
| OFF | | 15 SECONDS | 3 SECONDS |
| #7 | | MOTOR START-UP COUNTER 5 STARTS MAX AND RESET EVERY 5 MINUTES | |
| ON* | | ENABLE | |
| OFF | | DISABLE | |
| #8 | | HARDWARE TEST | |
| ON | | ENABLE | |
| OFF* | | DISABLE | |
| #9 | #10 | FLUSH ON SHUT DOWN ENABLE AFTER 10 MINUTES OF RUN | |
| ON | ON | NONE | |
| ON | OFF* | 60 SECONDS | |
| OFF | ON | 120 SECONDS | |
| OFF | OFF | 240 SECONDS | |

Switches 1 and 2 select the run times of the filtration system and the flush cycle. It is generally preferred that the water filtration system is activated for 120 minutes, and then the flush cycle is automatically activated for 120 seconds.

Switches 3 and 4 select the range of impurities that must be removed by the filter membrane (i.e., the % reject ratio). If the selected range of impurity removal is not maintained, the filtration system will be deactivated by turning off the pump 58 and feedwater solenoid 56. The amount of impurities removed is determined by comparing the TDS measured by the feed water probe 61 and the product water probe 68. In the preferred setting, at least 95% of the TDS of the feed water must be absent in the product water for the filtration process to continue. Switch 5 determines how often the feed water probe and product water probe are to be energized for measuring the TDS. In the preferred setting, the TDS levels are checked every 60 seconds. After 10 consecutive signals below the set range the system is deactivated.

Switch 6 controls delay times for turning the pump 58 off and on. In the preferred setting the motor for pump 58 is not activated until the low pressure switch 60 indicates that the threshold pressure (e.g., 25 psi) has been present at the pump inlet for 30 seconds. The pump motor is not turned off until the low pressure switch 60 indicates that the turn off pressure (10 psi) has been present at the pump inlet for 3 seconds. These time delays serve to prevent rapid cycling of the pump 58 due to inlet pressure fluctuations.

When switch 7 is on, the number of times that the pump motor starts and stops in a five minute interval is counted. If the pump motor is started five times in the five minute interval, the system is shut down and the service light is turned on. The counter is reset after every five minute interval.

When switch 8 is activated, the microprocessor executes an internal test of the components of the control system.

Switches 9 and 10 determine if a flush cycle is automatically performed when the filtration system is shut down, such as when the storage tank 66 is full. In the preferred setting, a 60 second flush will automatically occur before shut down. However, no flush prior to shut down will occur if the filtration system has not been running for the last ten minutes. At shut down, the pump motor is deactivated and the feed water solenoid 56 is closed.

The microprocessor board 83 also includes the system activation switch S2, which is shown in box 105 on FIG. 3. When switched to automatic mode, the R.O. system and control functions operate as described herein, and when the storage tank 66 is full, the microprocessor controller operates to turn off the pump motor. In manual mode, the system functions just like it does in automatic mode, except that the pump motor is not deactivated if the storage tank 66 is full. Thus, the R.O. system continues to filter water even though the storage tank may be full.

The microprocessor 96 uses a software program stored in the EPROM (Erasable Programmable Read Only Memory) 97. This program used in conjunction with the hardware shown in FIGS. 2 and 3 will perform all the control functions described herein. It should be readily apparent to one skilled in the art how to implement this software program in the hardware shown in FIG. 3 to provide the control functions described herein.

In general terms, the software controls the hardware in the following ways. The software enables the hardware to read input data, for example, from the tank level sensor 67, the feed water probe 61 and the product water probe 68. The software then interprets this data, and then controls the hardware to execute the various control functions. For example, when the tank level sensor 67 indicates that the tank 66 is full and the system is in automatic mode, the software then generates signals that will turn off the motor for the pump 58. When the tank level sensor 67 indicates that the water level is below full, the software will generate signals that will initiate the restart sequence.

The software will count time and at intervals selected by DIP switch 5 will send signals to energize the feed water probe 61 and the product water probe 68. The software will then compare the TDS levels measured by these probes to determine the % reject ratio achieved with the R.O. filter. The software will send signals to illuminate the LED that corresponds to this % reject ratio. The software checks this % reject ratio with that selected with DIP switches 3 and 4. If the preselected % reject ratio is not being achieved, the software will generate signals that will deactivate the pump motor, but not until 10 consecutive signals below the set range have been received.

The software processes data received from the pump inlet pressure sensor 60. If the pump inlet pressure is below its predetermined threshold, the software generates signals that will deactivate the pump motor. The software makes sure that the pump inlet pressure returns to its inlet pressure for a preselected interval before the pump motor is reactivated.

The software controls the feed water solenoid 56 and the flush solenoid 84. When the control switch S2 (FIG. 3) is turned to Auto or Manual mode, the software sends signals to open the feed water solenoid. The software also sends the signals that open and close the flush solenoid at the intervals selected in accordance with DIP switches 1 and 2.

The software checks the status of the other DIP switches as well. When switch 7 is on, the software keeps track of the number of times that the pump motor cycles on and off in a five minute interval. If it cycles five times in that interval, the software generates the signals that illuminate the service LED and that turn off the pump motor. When DIP switch 8 is turned on, the software controls an internal test of the microprocessor hardware. The software also controls whether or not there is an automatic flush on shut down in accordance with DIP switches 9 and 10.

The software is also provided with initialization, interrupt, timer, display and internal test routines that are appropriate for the controls and functions utilized.

The operation of the liquid purification system of the preferred embodiment of the present invention will now be described. First, the switches for the control functions listed in Table 1 above should be set to their desired settings. Samples of the feed water can be taken through sample valve 54 for initial evaluation of the quality of the feed water. The feed water should have the following chemistry:

TABLE 2

| Parameter | Limits | Parameter | Limits |
|---|---|---|---|
| Hardness | <1 grain for up to 50% recovery | Manganese Hydrogen Sulfide | up to .05 mg/liter none allowable |
| Iron (Fe) | <.1 mg/liter | organics | <1 mg/liter |
| Free Chlorine | <.1 mg/liter | Total Dissolved Solids | up to 2000 mg/liter |
| Turbidity | SDI<5 | Temperature | 40 degrees F.– 80 degrees F. |

The feed water should also have a minimum flow rate and pressure of 5 GPM at 35 psi. Minimum pipe size should be ¾". To activate the R.O. filtration system, the switch S2 (FIG. 3) is turned to Auto or Manual mode. After some initialization and internal test routines, the software sends signals to open the feed water solenoid 56 and activate the motor for the pump 58. Feed water is then pumped into the filter cartridge 62. Some of the water will pass through the R.O. filter membrane 63, thereby removing impurities from the water. The product water flows out of the filter cartridge through a first outlet port 64, and is sent to a storage tank 66.

Feed water that does not pass through the R.O. membrane 63 exits the filter cartridge at a second outlet port 74. This water then passes through a pressure relief valve 78. Some of the water then passes through a flow control element 80 that maintains a constant flow rate, and then to drain. The remaining water is returned to the pump inlet for recycling through the R.O. filter 62.

The proper filtration efficiency is obtained by adjusting the pressure relief valve until the flow rate of the product water or the system pressure reaches its maximum recommended level. At that point the flow control element will maintain a substantially constant recovery rate of the filtered water, such as 50%. The maximum recommended flow rate for the system (1 GPM) is indicated next to the product water flow meter 70, and the maximum recommended pump pressure (200 psi) is indicated next to the pressure gauge 76. The flow control restrictor 80 in the preferred embodiment maintains a 1 GPM flow rate through it, regardless of operating conditions, and thus the recovery rate is 50% when maximum product water flow rate is 1 GPM. (In this mode of operation, the flow rate at the second outlet port 74 typically will be 3 GPM, and the flow rate of the recycle water to the pump 58, through check valve 86, will be 2 GPM.) The microprocessor controller 83 will automatically perform the control functions selected by the DIP switches.

While in the preferred embodiment the maximum flow rate allowed by the flow control restrictor 80 is 1 GPM and the maximum recommended pump pressure is 200 psi, the variable quality of the feed water affects the maximum flow rate at which the system can operate. A major advantage of the present invention is that the system is easily adjusted to the point of maximum efficiency for any given feed water.

It should be understood that various changes and modifications to the preferred embodiment described above will be apparent to those skilled in the art. For example, in place of a positive displacement pump 58, an appropriately sized multi-stage pump could be used.

It is intended that the foregoing description be regarded as illustrative rather than limiting, and that it be understood that it is the following claims, including all equivalents, which are intended to define the scope of the invention.

We claim:

1. A purification system for purifying a feed liquid to produce a purified liquid, said system being controlled by a single pressure control valve to achieve optimum predetermined operating conditions and to adjust operation of the system to such optimum operating conditions in order to compensate for changes, including temperature and pressure changes, said system comprising:

(a) filter means including:
        a housing,
        an inlet port in said housing,
        a first outlet port in said housing,
        a second outlet port in said housing,
        a filtering membrane separating said inlet port from said first outlet port;
    (b) means for determining a maximum specified flow rate downstream of the first outlet port;
    (c) a pressure control valve means, downstream of said second outlet port, for maintaining a predetermined pressure upstream thereof by varying the flow of liquid therethrough, said pressure control valve means allowing flow of liquid under the system operating conditions;
    (d) means for determining a maximum specified pressure downstream of the second outlet port but upstream of said control valve;
    (e) a self-adjusting flow control element means for maintaining a substantially constant flow therethrough, said control element means being downstream of said pressure control valve means;
    (f) a line downstream of said control valve means, said line being in parallel with said flow control element means;
    (g) means for maintaining a flow of liquid in said line above a predetermined pressure;
    (h) means for pumping feed liquid into said inlet port such that a first portion of said feed liquid passes through said membrane, past the first outlet port and said means for determining a maximum specified flow rate and is recovered as purified liquid and such that a second portion of said feed liquid passes through said second outlet port, said means for determining the maximum specified pressure, said pressure control valve means and simultaneously into both said flow control element means and said line, predetermined operating conditions being settable by adjustment of said control valve means until a first occurring of the maximum specified flow rate determined by said flow rate determining means, or the maximum pressure, determined by said pressure determining means, is reached, said control valve means allowing adjustment during operation to maintain the operation of said system at preselected operating conditions.

2. The system of claim 1 wherein said liquid is water.

3. The system of claim 2 wherein the membrane comprises a reverse osmosis membrane.

4. The system of claim 3 wherein said flow rate determining means comprises a flow meter.

5. The system of claim 3 where said line communicates with an inlet to said means for pumping.

6. The system of claim 5 further comprising a check valve in said line and a flush valve in parallel with said control valve means, said flush valve allowing a third portion of the second portion of said liquid from said second outlet port to discharge out of the system increasing turbulence and flow through said filter means, said check valve preventing flow into said line from said inlet to the means for pumping.

7. The system of claim 3 wherein said flow control element comprises a self-adjusting variable area orifice valve.

8. The system of claim 7 wherein said control valve is operable to maintain the liquid pressure upstream of said control valve at about 200 psi.

9. The system of claim 3 wherein said means for determining the maximum specified flow rate comprises a flow meter.

10. The system of claim 3 wherein said pressure control valve means comprises a pressure relief valve.

11. The system of claim 3 wherein said means/or determining the maximum specified pressure comprises a pressure gauge.

12. The system of claim 3 wherein said means for maintaining the flow of liquid comprises a check valve.

13. A system for removal of impurities from feed water to produce a purified water, said system being controlled by a single valve to achieve and maintain optimum predetermined conditions, said system comprising:

(a) a pump for pumping feed water;
    (b) a filter means comprising a reverse osmosis membrane a first outlet and a second outlet, said filter means adapted to receive said feed water and to discharge water purified by passing it through said reverse osmosis membrane from the first outlet and to discharge feed water that by-passes said reverse osmosis membrane from the second outlet;
    (c) a pressure relief valve means for receiving water from the second outlet and for maintaining the pressure of said water at a substantially constant level upstream thereof and a substantially lower level downstream thereof;
    (d) a variable area orifice valve means for maintaining substantially constant flow downstream of said pressure relief valve;
    (e) means for determining flow rates of water passing through said first outlet;

(f) means for determining the pressure downstream of said second outlet, said pressure relief valve being adjustable to allow reaching the first occurring of a maximum preselected flow rate through element (e) or a maximum preselected pressure indicated by said pressure determining means, so that the pressure relief valve achieves and maintains the optimum predetermined conditions.

14. The system of claim 13 wherein said means for determining the flow rates through said first outlet comprises a flow meter.

15. The system of claim 13 wherein said means for determining pressure comprises a pressure gauge.

* * * * *

UNITED STATES PATENT AND TRADEMARK OFFICE
CERTIFICATE OF CORRECTION

PATENT NO. : 5,503,735
DATED : April 2, 1996
INVENTOR(S) : Paul F. Vinas et al.

It is certified that error appears in the above-indentified patent and that said Letters Patent is hereby corrected as shown below:

Col. 9, claim 1, line 4, after "adjust" insert --the--.

Col. 10, claim 11, line 1, delete "or" and substitute --for--.

Signed and Sealed this

Twentieth Day of August, 1996

Attest:

BRUCE LEHMAN

*Attesting Officer*     *Commissioner of Patents and Trademarks*